United States Patent
Hirakawa et al.

(10) Patent No.: US 10,670,812 B2
(45) Date of Patent: Jun. 2, 2020

(54) OPTICAL FIBER

(71) Applicant: FUJIKURA LTD., Tokyo (JP)

(72) Inventors: Keisuke Hirakawa, Chiba (JP); Kentaro Ichii, Chiba (JP); Kazuyuki Hayashi, Chiba (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 16/329,145

(22) PCT Filed: May 30, 2017

(86) PCT No.: PCT/JP2017/020145
§ 371 (c)(1),
(2) Date: Feb. 27, 2019

(87) PCT Pub. No.: WO2018/042788
PCT Pub. Date: Mar. 8, 2018

(65) Prior Publication Data
US 2019/0204512 A1    Jul. 4, 2019

(30) Foreign Application Priority Data
Aug. 30, 2016 (JP) ................. 2016-168271

(51) Int. Cl.
*G02B 6/30* (2006.01)
*G02B 6/024* (2006.01)
(Continued)

(52) U.S. Cl.
CPC ............ *G02B 6/30* (2013.01); *G02B 6/024* (2013.01); *G02B 6/036* (2013.01); *G02B 6/255* (2013.01)

(58) Field of Classification Search
CPC .......... G02B 6/30; G02B 6/255; G02B 6/036; G02B 6/024
See application file for complete search history.

(56) References Cited

U.S. PATENT DOCUMENTS

| 5,074,633 A | 12/1991 | Cohen et al. |
|---|---|---|
| 6,157,758 A | 12/2000 | Abe et al. |

(Continued)

FOREIGN PATENT DOCUMENTS

| CN | 1287103 A | 3/2001 |
|---|---|---|
| CN | 1666124 A | 9/2005 |

(Continued)

OTHER PUBLICATIONS

Decision to Grant a Patent for Japanese Application No. 2016-168271 dated Feb. 27, 2018 (2 pages).

(Continued)

*Primary Examiner* — Ellen E Kim
(74) *Attorney, Agent, or Firm* — Osha Liang LLP

(57) ABSTRACT

An optical fiber includes: a core that includes quartz glass doped with a core updopant; an inner cladding that includes quartz glass doped with a cladding updopant and a downdopant and that covers a circumferential surface of the core; and an outer cladding that includes quartz glass and that covers an outer circumferential surface of the inner cladding. A refractive index of the inner cladding is substantially equal to a refractive index of the outer cladding. The inner cladding contains the cladding updopant at a concentration such that a refractive index increase rate ascribed to the cladding updopant falls within a range of 0.25% to 0.5%.

16 Claims, 7 Drawing Sheets

(51) Int. Cl.
*G02B 6/036* (2006.01)
*G02B 6/255* (2006.01)

(56) References Cited

U.S. PATENT DOCUMENTS

| | | | |
|---|---|---|---|
| 6,221,555 B1 | 4/2001 | Murakami et al. | |
| 7,680,381 B1* | 3/2010 | Bookbinder | G02B 6/03638 385/126 |
| 8,406,599 B1 | 3/2013 | Dragic | |
| 8,554,036 B2* | 10/2013 | Ooizumi | G02B 6/0288 385/124 |
| 9,162,917 B2* | 10/2015 | Burov | C03B 37/01211 |
| 2003/0063875 A1 | 4/2003 | Bickham et al. | |
| 2004/0218851 A1* | 11/2004 | Izumitani | G02B 6/02033 385/15 |
| 2005/0135762 A1 | 6/2005 | Ikeda et al. | |
| 2006/0140565 A1 | 6/2006 | Ikeda et al. | |
| 2008/0025679 A1 | 1/2008 | Ikeda et al. | |
| 2008/0292251 A1 | 11/2008 | Miyabe et al. | |
| 2013/0182314 A1* | 7/2013 | Bennett | H01S 3/06783 359/341.3 |
| 2013/0322816 A1 | 12/2013 | Takahashi et al. | |

FOREIGN PATENT DOCUMENTS

| | | |
|---|---|---|
| EP | 1533634 A1 | 5/2005 |
| JP | S57-011848 A | 1/1982 |
| JP | S62-270903 A | 11/1987 |
| JP | H03-130705 A | 6/1991 |
| JP | H05224060 A | 9/1993 |
| JP | H08-313749 A | 11/1996 |
| JP | H11-211920 A | 8/1999 |
| JP | 2002-040278 A | 2/2002 |
| JP | 2003-057480 A | 2/2003 |
| JP | 2003-075293 A | 3/2003 |
| JP | 2003-075677 A | 3/2003 |
| JP | 2003177270 A | 6/2003 |
| JP | 2004295010 A | 10/2004 |
| JP | 3993198 B2 | 10/2007 |
| JP | 2012-086999 A | 5/2012 |
| JP | 2014-197214 A | 10/2014 |
| JP | 5900484 B2 | 4/2016 |
| WO | 01/33266 A1 | 5/2001 |
| WO | 2004/005984 A1 | 1/2004 |

OTHER PUBLICATIONS

Decision of Refusal for Japanese Application No. 2016-168271 dated Oct. 24, 2017 (2 pages).
Notification of Reasons for Refusal for Japanese application No. 2016-168271 dated Jul. 4, 2017 (2 pages).
Svetislav Savovic et al., "Influence of initial dopant distribution in fiber core on refractive index distribution of thermally expanded core fibers"; Optical Materials, vol. 30, Issue 9, 2008 (5 pages).
H. Hanafusa et al., "Thermally-diffused Expanded Core Fibres for Low-loss and Inexpensive Photonic Components"; Electronics Letters, vol. 27, No. 21, pp. 1968-1969, 1991 (2 pages).
Extended European Search Report issued in corresponding European Application No. 17845799.0, dated Feb. 28, 2020 (11 pages).

* cited by examiner

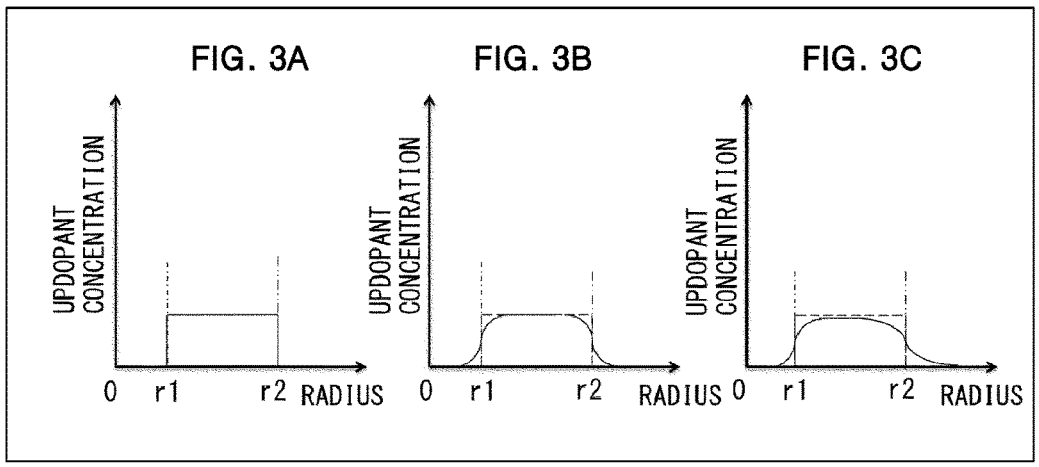
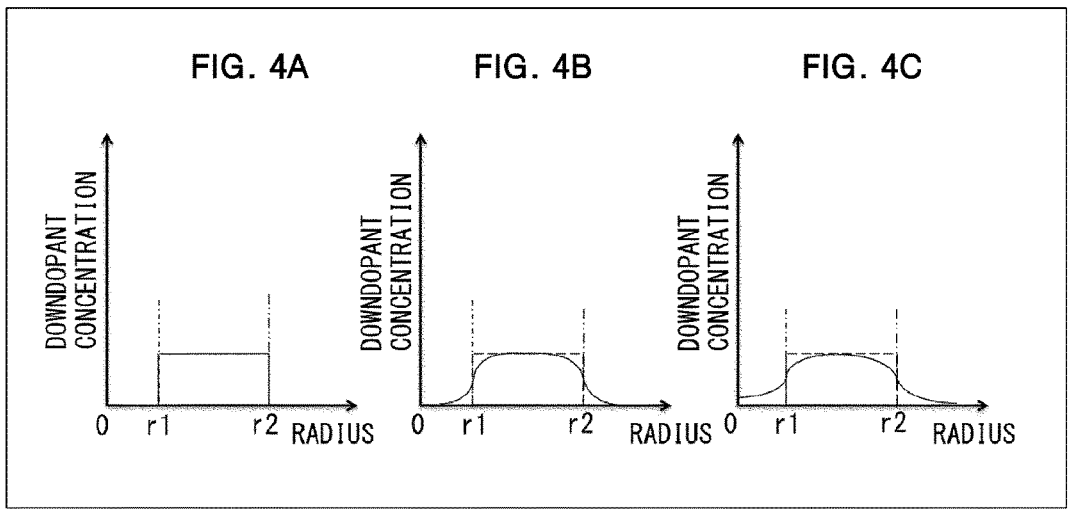

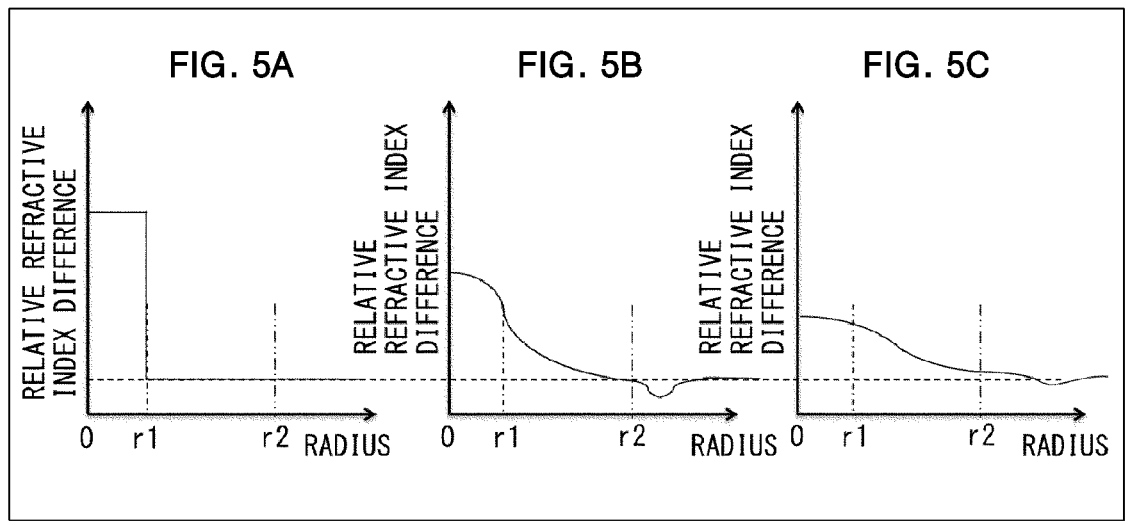
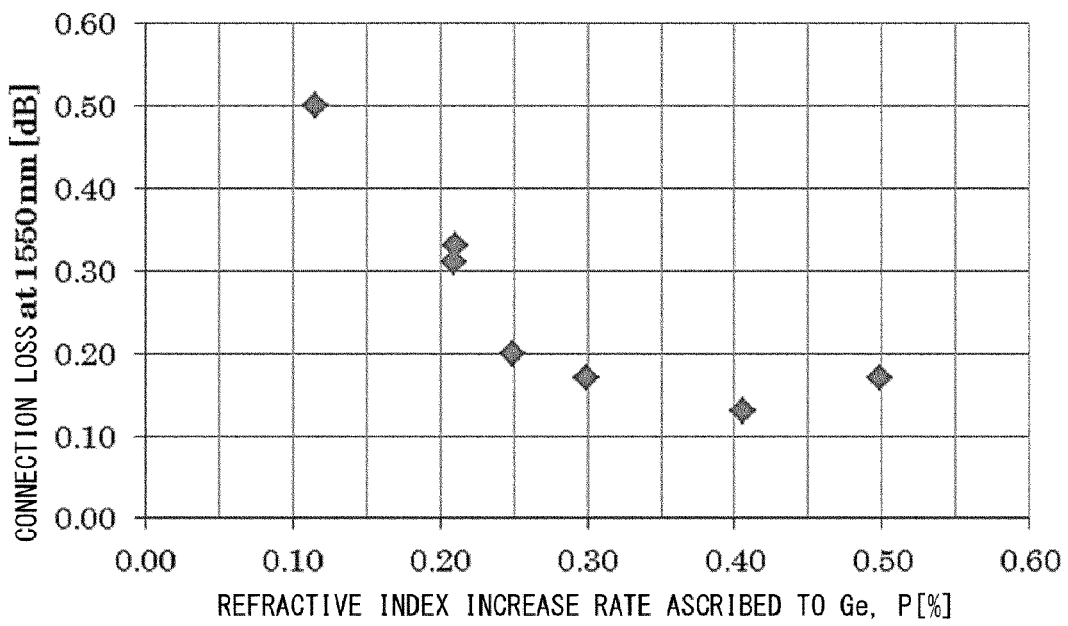

OPTICAL FIBER

TECHNICAL FIELD

The present invention relates to an optical fiber whose core is expandable through thermal diffusion.

BACKGROUND

Semiconductor optical waveguides, typically, silicon optical waveguides are highly expected to be a technique which will contribute to higher integration of optical communication devices. In response to such expectation, for example, silicon waveguides having functions of an optical modulator, a photodetector, an optical switch, etc. have been provided, and have found their application in optical communications.

In many cases, a conventional single mode fiber (CSMF) is connected to a semiconductor optical waveguide so as to propagate incident light to enter the semiconductor optical waveguide or light having exited from the semiconductor optical waveguide. However, the CSMF has a mode field diameter of approximately 10 μm whereas the semiconductor optical waveguide has a mode field diameter of approximately 1 μm. Thus, the semiconductor optical waveguide butt-joined to the CSMF causes an excessively large connection loss due to a difference in mode field diameter. Due to such a connection loss, the CSMF and the semiconductor optical waveguide butt-joined to each other cannot be put to practical use.

In light of this, there has been proposed a method of making a spot size converter (SSC) in a semiconductor optical waveguide and connecting a CSMF to the SSC (see Patent Literature 1). However, the SSC causes a large loss in a case where the mode field diameter of the semiconductor optical waveguide is increased by use of the SSC substantially up to the mode field diameter of the CSMF. There has been examined a method including (1) butt-joining one end of a bridge fiber having a mode field diameter of 4 μm to a semiconductor optical waveguide having a mode field diameter increased to 4 μm by use of an SSC, and (2) fusion-splicing, to the other end of the bridge fiber, a CSMF having a mode field diameter of 10 μm.

Employed as such a bridge fiber is an optical fiber that includes a thermally diffused expanded core (TEC), specifically, an optical fiber whose core is expandable through thermal diffusion (see Patent Literatures 2 and 3). This reduces a difference in mode field diameter between the bridge fiber and the CSMF, because the core of the bridge fiber expands during fusion-splicing of the core to the CSMF or subsequent heating of the core. It is accordingly possible to reduce a connection loss to a low level at a fusion-splicing point between the bridge fiber and the CSMF.

Note that the core expands through thermal diffusion, because an updopant (i.e., additive for increasing a refractive index of quartz glass) added to form the core diffuses to surroundings of the core when being heated. Assume that germanium (Ge) is added as the updopant for forming the core. In this case, it has been known that the core can expand at a higher rate to surroundings codoped with germanium, phosphorus (P), and fluorine (F) (see Patent Literature 4).

CITATION LIST

Patent Literature

[Patent Literature 1]
Japanese Patent Publication No. 5900484 (Publication Date: Apr. 6, 2016)

[Patent Literature 2]
Japanese Patent Application Publication Tokukaihei No. 3-130705 (Publication Date: Jun. 4, 1991)

[Patent Literature 3]
Japanese Patent Application Publication Tokukai No. 2003-75677 (Publication Date: Mar. 12, 2003)

[Patent Literature 4]
Japanese Patent Publication No. 3993198 (Publication Date: Oct. 17, 2007)

However, regarding an optical fiber including a core made of quartz glass doped with germanium and an inner cladding made of quartz glass doped with germanium, phosphorus, and fluorine, the present inventors have found that the optical fiber containing these dopants merely at known concentrations cannot sufficiently reduce a connection loss (e.g., to 0.2 dB or less) at a fusion-splicing point between the optical fiber and the CSMF. It follows that the core cannot sufficiently expand through thermal diffusion.

SUMMARY

Embodiments of the present invention provide an optical fiber whose core expands through thermal diffusion and whose connection loss is sufficiently reduced (e.g., to 0.2 dB or less) at a fusion-splicing point between the optical fiber and a CSMF.

An optical fiber in accordance with one or more embodiments of the present invention includes: a core made of quartz glass doped with a core updopant; an inner cladding made of quartz glass doped with both of a cladding updopant and a downdopant, the inner cladding covering a circumferential surface of the core; and an outer cladding made of quartz glass, the outer cladding covering an outer circumferential surface of the inner cladding, the inner cladding having a refractive index substantially equal to a refractive index of the outer cladding, and the inner cladding containing the cladding updopant at a concentration that is set such that a refractive index increase rate ascribed to the cladding updopant falls within a range of 0.25% to 0.5%.

According to one or more embodiments of the present invention, it is possible to provide an optical fiber whose core is expandable through thermal diffusion and whose connection loss can be sufficiently reduced at a fusion-splicing point between the optical fiber and a CSMF.

BRIEF DESCRIPTION OF DRAWINGS

FIG. 2A shows concentration distribution before heat treatment, FIG. 2B shows concentration distribution during the heat treatment, and FIG. 2C shows concentration distribution after the heat treatment.

FIGS. 3A-3C are graphs showing concentration distribution of each updopant added to an inner cladding of the optical fiber of FIG. 1. FIG. 3A shows concentration distribution before heat treatment, FIG. 3B shows concentration distribution during the heat treatment, and FIG. 3C shows concentration distribution after the heat treatment.

FIGS. 4A-4C are graphs showing concentration distribution of a downdopant added to the inner cladding of the optical fiber of FIG. 1. FIG. 4A shows concentration distribution before heat treatment, FIG. 4B shows concentration distribution during the heat treatment, and FIG. 4C shows concentration distribution after the heat treatment.

FIGS. 5A-5C are graphs showing refractive index distribution of the optical fiber of FIG. 1. FIG. 5A shows refractive index distribution before heat treatment, FIG. 5B shows refractive index distribution during the heat treatment, and FIG. 5C shows refractive index distribution after the heat treatment.

FIG. 6 is a graph showing a correlation between a refractive index increase rate Δ that is ascribed to each updopant added to an inner cladding of an optical fiber in accordance with each of Examples according to one or more embodiments and Comparative Examples, and a connection loss of the optical fiber at a wavelength of 1550 nm.

DETAILED DESCRIPTION (Structure of Optical Fiber)

Figure 1:
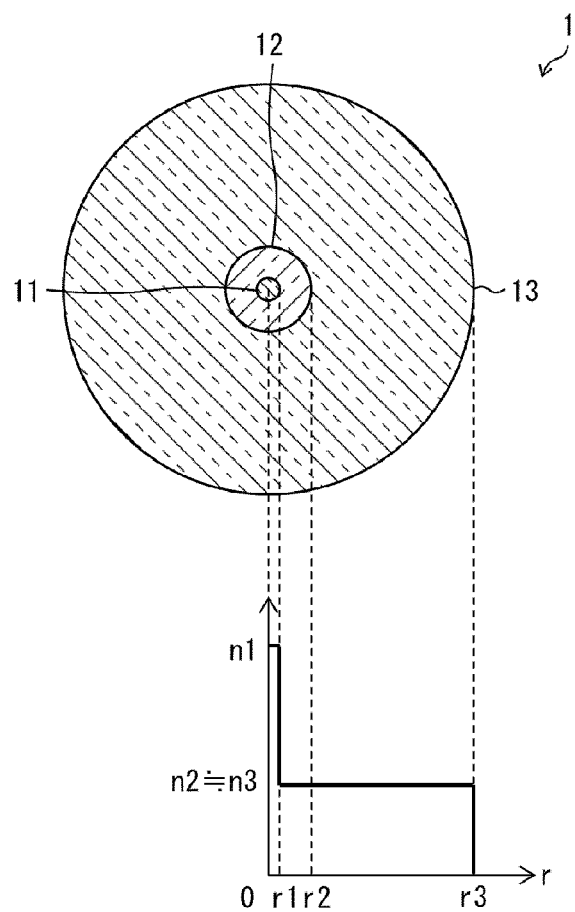
FIG. 1 illustrates a structure and refractive index distribution of an optical fiber in accordance with one or more embodiments. An upper part of FIG. 1 is a cross-sectional view illustrating the structure of the optical fiber and a lower part of FIG. 1 is a graph showing the refractive index distribution of the optical fiber.

The following description will discuss a structure of an optical fiber 1 in accordance with one or more embodiments of the present invention with reference to FIG. 1. An upper part of FIG. 1 is a cross-sectional view illustrating a structure of the optical fiber 1. A lower part of FIG. 1 is a graph showing refractive index distribution of the optical fiber 1.

As illustrated in the upper part of FIG. 1, the optical fiber 1 includes a core 11 having a circular cross section, an inner cladding 12 having an annular cross section and covering a circumferential surface of the core 11, and an outer cladding 13 having an annular cross section and covering an outer circumferential surface of the inner cladding 12. The optical fiber 1 can further include a protective coating layer (not illustrated), which has an annular cross section and covers an outer circumferential surface of the outer cladding 13.

In one or more embodiments, the core 11 has a diameter d1 of 4 μm, the inner cladding 12 has a diameter (outer diameter) d2 of 16 μm, and the outer cladding 13 has a diameter (outer diameter) d3 of 80 μm. Note that the diameter d3 of the outer cladding 13 is set to 80 μm with a view to ensuring reliability concerning a mechanical strength of the optical fiber even in a bent form. The diameter d3 of the outer cladding 13 can be set to 125 μm depending on application and/or use environment of the optical fiber 1.

The core 11 is made of quartz glass doped with germanium (Ge) as an updopant. Thus, the core 11 has a higher refractive index n1 than a refractive index n3 of the outer cladding 13 (the refractive index n3 is substantially the same as a refractive index of pure quartz glass as described later), as shown in the lower part of FIG. 1. In one or more embodiments, in order to ensure a mode field diameter of 3.5 μm to 6.5 μm at a wavelength of 1550 nm, a concentration of the updopant to be added to the core 11 is set such that a relative refractive index difference Δ1 of the core 11 with respect to the outer cladding 13 falls within a range of 1.0% to 2.8%, which relative refractive index difference Δ1 is expressed by $\Delta 1 = [(n1-n3)/n1] \times 100$.

Note that although one or more embodiments employ germanium as an updopant to be added to the core 11, other embodiments of the present invention are not limited thereto. Specifically, phosphorus (P) can be added as an updopant to the core 11 in place of germanium. Alternatively, phosphorus can be added as an updopant to the core 11 in addition to germanium.

The inner cladding 12 is made of quartz glass doped with (1) fluorine (F) as a downdopant that promotes diffusion of the updopant added to the core 11 and (2) germanium (Ge) and phosphorus (P) as updopants that cancel a reduction in refractive index which reduction would be caused by the downdopant. Thus, the inner cladding 12 has a refractive index n2 that is substantially equal to the refractive index n3 of the outer cladding 13, as shown in the lower part of FIG. 1. In one or more embodiments, (1) a concentration of each of the updopants to be added to the inner cladding 12 is set such that a refractive index increase rate Δ ascribed to the updopants falls within a range of 0.25% to 0.50%, and also (2) a concentration of the downdopant in the inner cladding 12 is set such that an absolute value of a relative refractive index difference Δ2 of the inner cladding 12 with respect to the outer cladding 13 becomes 0.10% or less, which relative refractive index difference Δ2 is expressed by $\Delta 2 = [(n2-n3)/n2] \times 100$. Note that the refractive index increase rate Δ ascribed to the updopants is defined by $[(n'-n)/n'] \times 100$, where n is a refractive index of quartz glass which has not yet been doped with the updopants and n' is a refractive index of the quartz glass doped with the updopants.

Note that although one or more embodiments employ fluorine as a downdopant to be added to the inner cladding 12, other embodiments of the present invention are not limited thereto. Specifically, boron (B) can be added as a downdopant to the inner cladding 12 in place of fluorine. Alternatively, boron can be added as a downdopant to the inner cladding 12 in addition to fluorine. One or more embodiments also employ both of germanium and phosphorus as updopants to be added to the inner cladding 12, but other embodiments of the present invention are not limited thereto. That is, only germanium can be added as an updopant to the inner cladding 12 or only phosphorus can be added as an updopant to the inner cladding 12.

The outer cladding 13 is made of quartz glass that is not intentionally doped with any element other than chlorine (Cl). That is, since the quartz glass constituting the outer cladding 13 contains neither an updopant nor a downdopant, the outer cladding 13 has the refractive index n3 that is substantially equal to a refractive index (1.46) of pure quartz glass.

As described earlier, the inner cladding 12 contains a sufficient amount of downdopant (an amount enough to cancel the refractive index increase rate Δ of 0.25% or more, which refractive index increase rate Δ is ascribed to the updopants added to the inner cladding 12). The downdopant itself diffuses into the core 11, so that the downdopant acts to reduce a refractive index of the core 11. The downdopant also promotes diffusion of the updopant added to the core 11 to the inner cladding 12, so that the downdopant acts to reduce a refractive index of the inner cladding 12. Hence, when the optical fiber 1 is fusion-spliced to another optical fiber, the diameter d1 of the core is sufficiently increased at and in the vicinity of a fusion-splicing point, so that a connection loss is sufficiently reduced at that fusion-splicing point.

In particular, fluorine added to the inner cladding 12 significantly promotes diffusion of germanium added to the core 11. Therefore, it is possible to significantly increase the diameter d1 of the core 11 at and in the vicinity of a fusion-splicing point and significantly reduce a connection loss at that fusion-splicing point, by adding germanium as an updopant to the core 11 as well as adding fluorine as a downdopant to the inner cladding 12 as in the previously described embodiments.

Meanwhile, in a case where the relative refractive index difference Δ1 of the core 11 with respect to the outer cladding 13 is less than 1.0%, a mode field diameter at a wavelength of 1550 nm exceeds 6.5 μm. Accordingly, a connection loss becomes large in a case where the optical fiber 1 is connected to a silicon waveguide. In contrast, in a case where the relative refractive index difference Δ1 of the core 11 with respect to the outer cladding 13 is more than 2.8%, the mode field diameter at the wavelength of 1550 nm becomes smaller than 3.5 μm. This makes alignment of the optical fiber 1 and the silicon waveguide difficult (i.e., an axial misalignment tolerance becomes smaller) upon connecting the optical fiber 1 to the silicon waveguide. Therefore, by setting the relative refractive index difference Δ1 of the core 11 with respect to the outer cladding 13 within a range of 1.0% to 2.8% as in the previously described embodiments, it becomes possible to not only reduce a connection loss but also easily align the optical fiber 1 and the silicon waveguide in a case where the optical fiber 1 is connected to the silicon waveguide.

Note that one or more embodiments implicitly define a concentration of the downdopant to be added to the inner cladding 12, by the concentration of each of the updopants to be added to the inner cladding 12 and the relative refractive index difference Δ2 of the inner cladding 12 with respect to the outer cladding 13. This is because a concentration of fluorine added as a downdopant to the inner cladding 12 is difficult to directly measure.

(Expansion of Core of Optical Fiber)

Next, described is how the core of the optical fiber 1 expands upon fusion-splicing the optical fiber 1 to another optical fiber.

Dopants added to different parts of the optical fiber 1 diffuse through heat treatment. Assuming that dopant concentration distribution u(r, 0) is δ(r) at a time 0, dopant concentration distribution u(r, t) at a time t is expressed by Equation (1):

[Math 1]

$$u(r, t) = \frac{1}{Dt}\exp\left(-\frac{r^2}{4Dt}\right), \quad (1)$$

where D is a diffusion coefficient, which is defined by Equation (2):

[Math 2]

$$D = D_0 \exp\left(-\frac{Q}{RT}\right), \quad (2)$$

where Q is an activation energy, R is a gas constant, T is an absolute temperature, and $D_0$ is an empirical constant.

Figure 2A:
FIGS. 2A-2C are graphs showing concentration distribution of an updopant added to a core of the optical fiber of FIG. 1.
Figure 2B:
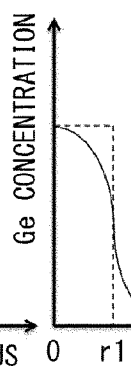
Figure 2C:
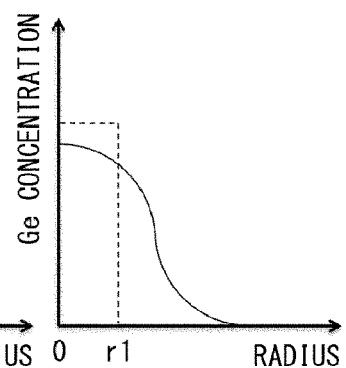

FIGS. 2A-2C are graphs showing concentration distribution of an updopant (germanium) added to the core 11 according to one or more embodiments. 2A shows concentration distribution of the updopant before heat treatment, FIG. 2B shows concentration distribution of the updopant during the heat treatment, and FIG. 2C shows concentration distribution of the updopant after the heat treatment. In FIGS. 2A-2C, r1 is the radius of the core 11 before the heat treatment and r2 is the radius of the inner cladding 12 before the heat treatment.

It is apparent from FIGS. 2A-2C that the heat treatment causes the updopant localized in a region where r<r1 (i.e., the core 11 before the heat treatment) to diffuse into a region where r>r1 (i.e., the inner cladding 12 before the heat treatment).

FIGS. 3A-3C are graphs showing concentration distribution of each of the updopants (germanium and phosphorus) added to the inner cladding 12 according to one or more embodiments. FIG. 3A shows concentration distribution of the updopants before heat treatment, FIG. 3B shows concentration distribution of the updopants during the heat treatment, and FIG. 3C shows concentration distribution of the updopants after the heat treatment. In FIGS. 3A-3C, r1 is the radius of the core 11 before the heat treatment.

It is apparent from FIGS. 3A-3C that the updopants localized in a region where r1<r<r2 (i.e., the inner cladding 12 before the heat treatment) diffuse asymmetrically into a region where r<r1 (i.e., the core 11 before the heat treatment) and into a region where r>r2 (i.e., the outer cladding 13 before the heat treatment). In other words, the updopants diffuse less into the region where r<r1 than into the region where r>r2. This is presumably because whereas the updopant is added to the region where r<r1, no updopant is added to the region where r>r1.

FIGS. 4A-4C are graphs showing concentration distribution of a downdopant (fluorine) added to the inner cladding 12 according to one or more embodiments. FIG. 4A shows concentration distribution of the downdopant before heat treatment, FIG. 4B shows concentration distribution of the downdopant during the heat treatment, and FIG. 4C shows concentration distribution of the downdopant after the heat treatment. In FIGS. 4A-4C, r1 is the radius of the core 11 before the heat treatment, and r2 is the radius of the inner cladding 12 before the heat treatment.

It is apparent from FIGS. 4A-4C that the downdopant localized in a region where r1<r<r2 (i.e., the inner cladding 12 before the heat treatment) diffuses substantially symmetrically into a region where r<r1 (i.e., the core 11 before the heat treatment) and into a region where r>r2 (i.e., the outer cladding 13 before the heat treatment) (the downdopant diffuses more symmetrically than the updopants). The downdopant diffuses substantially symmetrically presumably because a downdopant is added neither to the region where r<r1 nor to the region where r>r2. It follows that the downdopant diffuses in a larger amount from the region where r1<r<r2 to the region where r<r1, as compared with the updopants that diffuse from the region where r1<r<r2 to the region where r<r1.

FIGS. 5A-5C are graphs showing refractive index distribution of the optical fiber 1, according to one or more embodiments, in which distribution is estimated from the concentration distribution of the above dopants in FIGS. 2A-2C, 3A-3C, and 4A-4C. FIG. 5A shows refractive index distribution before heat treatment, FIG. 5B shows refractive index distribution during the heat treatment, and FIG. 5C shows refractive index distribution after the heat treatment. In FIGS. 5A-5C, r1 is the radius of the core 11 before the heat treatment, and r2 is the radius of the inner cladding 12 before the heat treatment.

It can be confirmed from FIGS. 5A-5C that a region which functions as a core and which has a relatively high refractive index expands through the heat treatment.

EXAMPLES

The following description will discuss actual measurements of a connection loss of each of optical fibers A through D prepared in accordance with Examples and optical fibers E through G prepared in accordance with Comparative Examples at a fusion-splicing point between each of the optical fibers and a CSMF.

The optical fibers A through G thus prepared each included a core whose diameter was 4 μm, an inner cladding whose diameter was 16 μm, and an outer cladding whose diameter was 80 μm. In each of the optical fibers A through G, the core was doped with germanium as an updopant, and the inner cladding was doped with fluorine as a downdopant and also doped with germanium and phosphorus as updopants. A concentration of germanium added to the core was determined in consideration of a relative refractive index difference of the core with respect to the outer cladding. That is, the concentration was determined such that the relative refractive index difference fell within a range of +1.0% to +2.8%. A concentration of each of the updopants added to the inner cladding was determined in consideration of an absolute value of a relative refractive index difference of the inner cladding with respect to the outer cladding. That is, the concentration was determined such that the absolute value of the relative refractive index difference became 0.10% or less. Meanwhile, the CSMF prepared for Examples and Comparative Examples was an optical fiber having a cladding diameter of 125 μm and a mode field diameter of 10.6 μm at a wavelength of 1550 nm.

First, with regard to the updopants added to the inner cladding of each of the optical fibers A through G, respective concentrations of the dopants were measured by use of an electron prove micro analyzer (EPMA). Further, a refractive index increase rate Δ ascribed to the updopants added to the inner cladding of each of the optical fibers A through G was calculated from the respective concentrations of the updopants, in accordance with a method described in Patent Literature 3. Table 1 shows, in second and third columns, the respective concentrations of the updopants thus measured for each of the optical fibers A through G and, in a fourth column, the refractive index increase rates A thus calculated for each of the optical fibers A through G.

Next, the optical fibers A through G each were fusion-spliced to the CSMF and a connection loss was measured at a fusion-splicing point. How the optical fibers A through G each were fusion-spliced to the CSMF is as follows. That is, an end surface of each of the optical fibers A through G and an end surface of the CSMF were smoothed by use of a fiber cleaner. The end surfaces thus smoothened were then fusion-spliced to each other by use of an arc discharge type fusion-splicer (specifically, FSM-100P manufactured by FUJIKURA, Ltd.). Further, how a connection loss was measured at the fusion-splicing point is as follows. That is, a transmission loss at a wavelength of 1550 nm was repeatedly measured while heat treatment by arc discharging was applied to the fusion-splicing point and the vicinity thereof. Then, the connection loss was calculated from a minimum value of the transmission loss thus measured. Table 1 shows, in a fifth column, the connection loss thus measured for each of the optical fibers A through G.

TABLE 1

| | Ge concentration [wt %] | P concentration [wt %] | Refractive index increase rate Δ ascribed to updopants [%] | Connection loss [dB] |
|---|---|---|---|---|
| Optical fiber A | 2.3 | 1.0 | 0.25 | 0.20 |
| Optical fiber B | 2.8 | 1.0 | 0.30 | 0.17 |
| Optical fiber C | 3.9 | 1.0 | 0.40 | 0.13 |
| Optical fiber D | 5.0 | 1.0 | 0.50 | 0.17 |
| Optical fiber E | 1.0 | 0.6 | 0.12 | 0.50 |
| Optical fiber F | 1.5 | 1.5 | 0.21 | 0.32 |
| Optical fiber G | 1.9 | 0.9 | 0.21 | 0.33 |

FIG. 6 is a graph showing a correlation between the refractive index increase rate Δ ascribed to the updopants and the connection loss at a wavelength of 1550 nm according to one or more embodiments. It is clear from the graph of FIG. 6 that the connection loss at a wavelength of 1550 nm could be reduced to 0.2 dB or less in cases where the refractive index increase rate Δ ascribed to the updopants was within a range of 0.25% to 0.50%. This is supposedly because the inner cladding was doped with the downdopant so as to have a downdopant concentration sufficient to cancel an increase in refractive index caused by the updopants, and accordingly, the downdopant promoted diffusion of the updopant from the core to the inner cladding and thus allowed the core to sufficiently expand.

In a case where the refractive index increase rate Δ ascribed to the updopants is less than 0.25%, the connection loss at a wavelength of 1550 nm exceeds 0.2 dB. In contrast, in a case where the refractive index increase rate Δ ascribed to the updopants is more than 0.50%, an increase in refractive index caused by the updopants cannot be cancelled by a reduction in refractive index which reduction is caused by only fluorine. In this case, an absolute value of a relative refractive index difference Δ2 of the inner cladding 12 with respect to the outer cladding 13 cannot be 0.10% or less. This leads to a cutoff wavelength that is longer than a desired value and/or a bending loss that is higher than a desired value.

(Variations)

By providing an outer cladding 13 of an optical fiber 1 with stress applying sections 14a and 14b, the optical fiber 1 can function as a polarization maintaining fiber.

Figure 7:
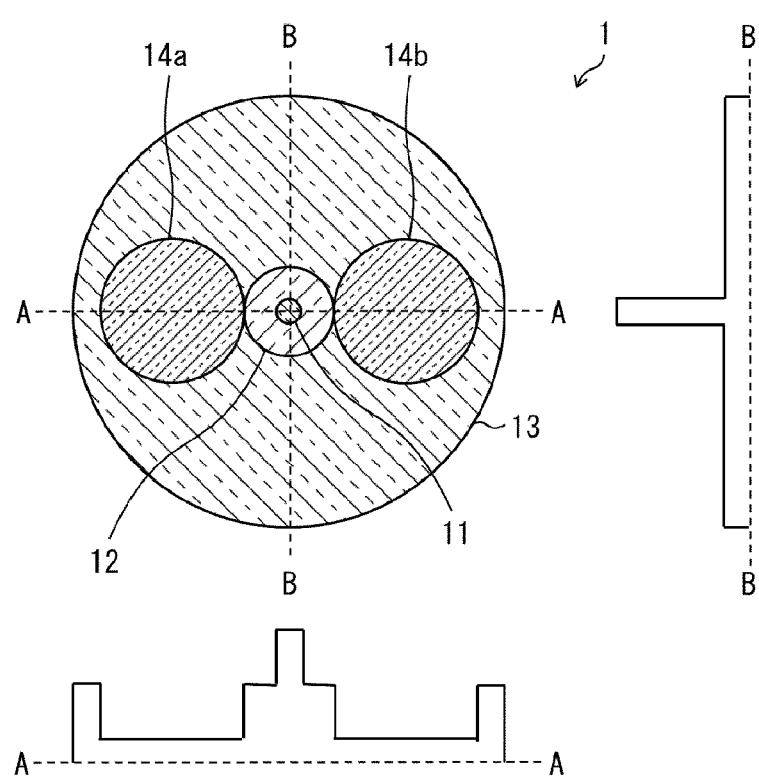
FIG. 7 illustrates a structure and refractive index distribution of an optical fiber (polarization maintaining fiber) in accordance with one or more embodiments.

FIG. 7 is a cross-sectional view illustrating a first configuration example of the optical fiber 1 that functions as the polarization maintaining fiber according to one or more embodiments. FIG. 7 shows, together with the cross-sectional view, refractive index distribution along the line AA (see a graph below the cross-sectional view) and that along the line BB (see a graph above the cross-sectional view).

The stress applying sections 14a and 14b each constitute a structure that has a circular cross section and is embedded in the outer cladding 13. The stress applying sections 14a and 14b each have a refractive index n4 smaller than a refractive index n3 of the outer cladding 13.

The stress applying sections 14a and 14b are provided such that the stress applying sections 14a and 14b are symmetrical with respect to the core 11 as viewed in a cross section of the optical fiber 1 and also that outer edges of the stress applying sections 14a and 14b are in contact with an outer edge of an inner cladding 12 as viewed in the cross section.

Figure 8:
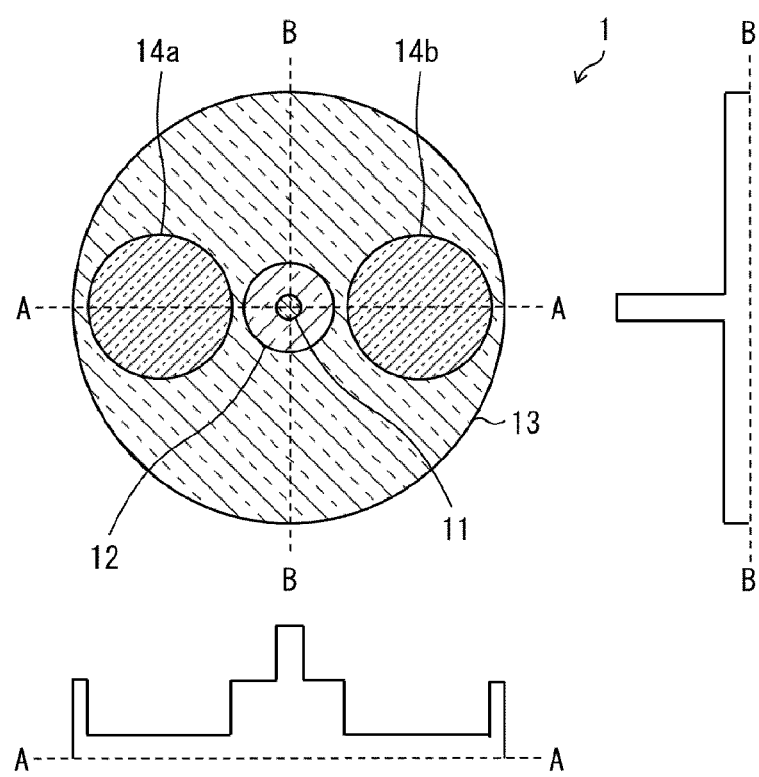
FIG. 8 illustrates a structure and refractive index distribution of an optical fiber (polarization maintaining fiber) in accordance with one or more embodiments.

FIG. 8 is a cross-sectional view illustrating a second configuration example of the optical fiber 1 that functions as the polarization maintaining fiber according to one or more embodiments. FIG. 8 shows, together with the cross-sectional view, refractive index distribution along the line AA (see a graph below the cross-sectional view) and that along the line BB (see a graph on the right side of the cross-sectional view).

The stress applying sections 14a and 14b each constitute a structure that has a circular cross section and is embedded in the outer cladding 13. The stress applying sections 14a and 14b each have the refractive index n4 smaller than the refractive index n3 of the outer cladding 13.

The stress applying sections 14a and 14b are provided such that the stress applying sections 14a and 14b are symmetrical with respect to the core 11 as viewed in a cross section of the optical fiber 1 and also that outer edges of the stress applying sections 14a and 14b are apart from the outer edge of the inner cladding 12 as viewed in the cross section.

Figure 9A:
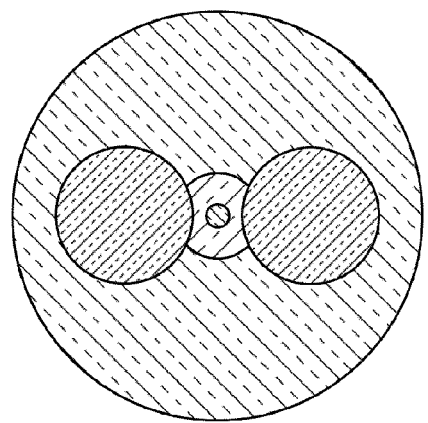
FIG. 9A is a cross-sectional view of a base material of the optical fiber (polarization maintaining fiber) in accordance with a comparative example and FIG. 9B is a cross-sectional view of the optical fiber after drawing.
Figure 9B:
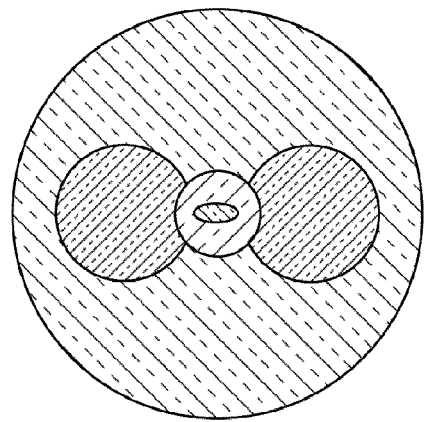

In the case of a configuration in which the stress applying sections overlap the inner cladding, a base material having a cross section of FIG. 9A is subjected to drawing, so that a polarization maintaining fiber is produced. Here, assuming that the outer cladding has a viscosity $\eta^{oc}$, the inner cladding has a viscosity $\eta^{ic}$, and the stress applying sections each have a viscosity $\eta^{sap}$, the following inequality is established: $\eta^{oc} > \eta^{ic} > \eta^{sap}$. Thus, during the above drawing, the outer cladding, the inner cladding, and the stress applying sections are hardened in this order. At this time, the inner cladding that originally has a noncircular cross section in the base material deforms by a surface tension, so that the inner cladding has a circular cross section. Such deformation of the inner cladding causes deformation of the core that originally has a circular cross section in the base material. In this deformation, the core is deformed so as to have a noncircular cross section. Consequently, the polarization maintaining fiber obtained as a result has a cross section as illustrated in FIG. 9B. Regarding the first configuration example of FIG. 7 and the second configuration example of FIG. 8, neither of the stress applying sections 14a and 14b overlaps the inner cladding 12. This makes it possible to prevent such noncircular deformation of the core 11 which may occur during the drawing. This consequently makes it possible to provide the optical fiber 1 of which the core 11 has a lower non-circularity, i.e., the core 11 has a higher roundness as compared to the optical fiber 1 configured such that the stress applying sections overlap the inner cladding.

Application Example

The optical fiber 1 in accordance with one or more embodiments of the present invention can be used as a bridge fiber to be interposed between a semiconductor optical waveguide and a conventional single mode fiber (CSMF).

Figure 10:
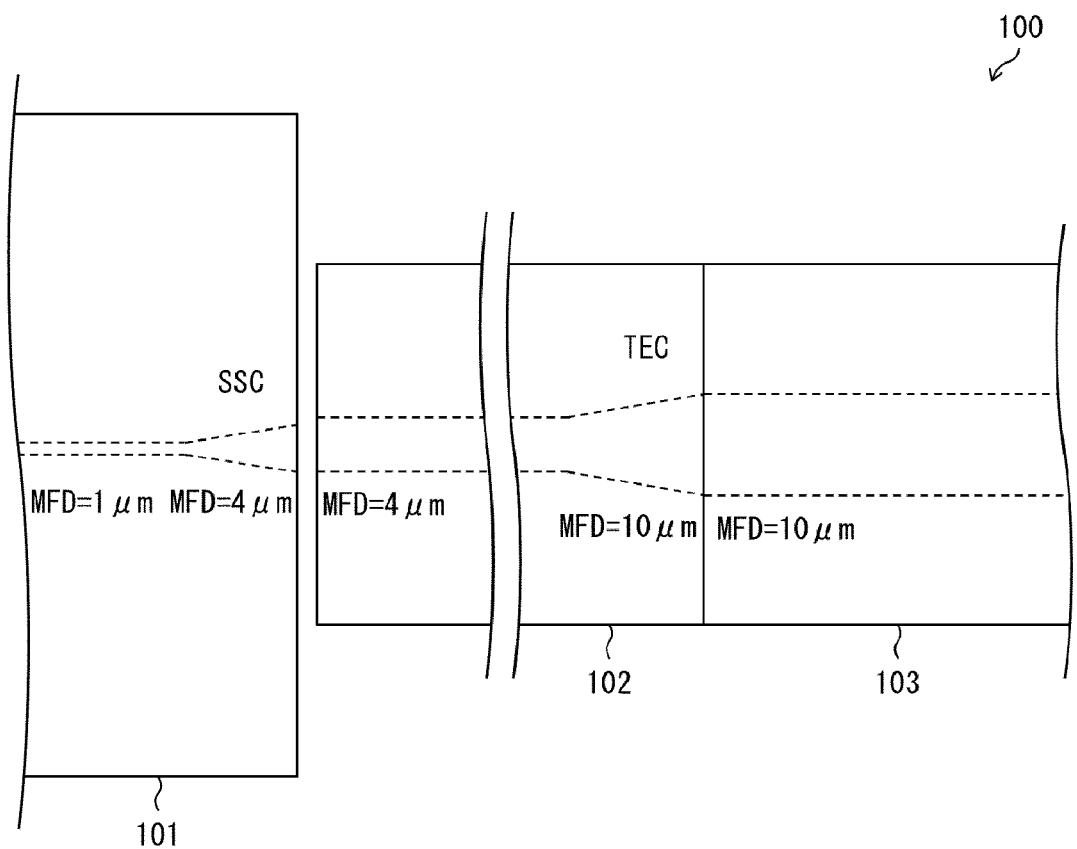
FIG. 10 is a top view illustrating a configuration of an optical device including the optical fiber of FIG. 1 according to one or more embodiments.

More specifically, a low-loss optical device 100 can be constituted by (1) a bridge fiber 102 made of the optical fiber 1 in accordance with one or more embodiments, (2) a semiconductor optical waveguide 101 butt-joined to one end of the bridge fiber 102, and (3) a CSMF 103 fusion-spliced to the other end of the bridge fiber 102, as illustrated in FIG. 10. The low-loss optical device 100 can be provided because upon fusion-splicing the bridge fiber 102 and the CSMF 103, a core of the bridge fiber 102 sufficiently expands at and in the vicinity of a fusion-splicing point between the bridge fiber 102 and the CSMF 103 and thus, a connection loss can be sufficiently reduced at the fusion-splicing point.

Note that the semiconductor optical waveguide 101 is, according to one or more embodiments, a silicon waveguide provided with a spot size converter (SSC). The CSMF 103 is, according to one or more embodiments, a single mode fiber having a mode field diameter of approximately 10 μm at a wavelength of 1550 nm. Examples of the single mode fiber include optical fibers classified into G.652 or G.657 fibers defined by the ITU-T.

(Recap)

An optical fiber in accordance with one or more embodiments of the present invention includes: a core made of quartz glass doped with a core updopant; an inner cladding made of quartz glass doped with both of a cladding updopant and a downdopant, the inner cladding covering a circumferential surface of the core; and an outer cladding made of quartz glass, the outer cladding covering an outer circumferential surface of the inner cladding, the inner cladding having a refractive index substantially equal to a refractive index of the outer cladding, and the inner cladding containing the cladding updopant at a concentration that is set such that a refractive index increase rate ascribed to the cladding updopant falls within a range of 0.25% to 0.5%.

The above configuration makes it possible to sufficiently expand the core of the optical fiber at and in the vicinity of a fusion-splicing point in fusion-splicing the optical fiber to another optical fiber (e.g., a CSMF). This allows for sufficient reduction of a connection loss (e.g., to 0.2 dB or less) at the fusion-splicing point.

The optical fiber in accordance with one or more embodiments of the present invention is configured such that the core contains the core updopant at a concentration that is set such that a mode field diameter at a wavelength of 1550 nm falls within a range of 3.5 μm to 6.5 μm.

The above configuration makes it possible to not only maintain an axial misalignment tolerance but also reduce a connection loss to a low level in a case where the optical fiber is butt-joined to a semiconductor waveguide.

The optical fiber in accordance with one or more embodiments of the present invention is configured such that the inner cladding contains the downdopant at a concentration that is set such that an absolute value of a relative refractive index difference of the inner cladding with respect to the outer cladding is 0.1% or less.

The above configuration in accordance with one or more embodiments makes it possible to obtain a cutoff wavelength, a bending loss, etc. which are approximate to desired values (values that the optical fiber is expected to have when the refractive index of the inner cladding is equal to that of the outer cladding), respectively. Note that the inner cladding having a larger refractive index than the outer cladding may cause a cutoff wavelength to increase and a single mode operation that cannot be easily carried out.

The optical fiber in accordance with one or more embodiments of the present invention is configured such that: the core is doped with germanium as the core updopant; and the inner cladding is doped with fluorine as the downdopant.

The above configuration makes it possible to further expand the core of the optical fiber at and in the vicinity of a fusion-splicing point in fusion-splicing the optical fiber to another optical fiber. This allows for further reduction of a connection loss at the fusion-splicing point.

The optical fiber in accordance with one or more embodiments of the present invention can be configured such that the inner cladding is doped with one or both of phosphorus and germanium as the cladding updopant. The optical fiber in accordance with one or more embodiments of the present invention can be configured such that the inner cladding is further doped with boron as the downdopant.

The optical fiber in accordance with one or more embodiments of the present invention is configured to further include a pair of stress applying sections provided symmetrically with respect to the core.

The above configuration makes it possible to allow the optical fiber to function as a polarization maintaining fiber.

The optical fiber in accordance with one or more embodiments of the present invention is configured such that the pair of stress applying sections are provided such that respective outer edges of the stress applying sections are in contact with or apart from an outer edge of the inner cladding.

The above configuration makes it possible to obtain a core which has a low non-circularity, i.e., a high roundness.

Note that the scope of the present invention encompasses an optical device including: the optical fiber described above; a semiconductor optical waveguide butt-joined to one end of the optical fiber; and a conventional single mode fiber (CSMF) that is fusion-spliced to the other end of the optical fiber.

(Additional Remarks)

Although the disclosure has been described with respect to only a limited number of embodiments, those skilled in the art, having benefit of this disclosure, will appreciate that other embodiments may be devised without departing from the scope of the present invention. Accordingly, the scope of the invention should only be limited by the attached claims.

REFERENCE SIGNS LIST

1 Optical fiber
11 Core
12 Inner cladding
13 Outer cladding
14a Stress applying section
14b Stress applying section

The invention claimed is:

1. An optical fiber comprising:
   a core that comprises quartz glass doped with a core updopant;
   an inner cladding that comprises quartz glass doped with a cladding updopant and a downdopant and that covers a circumferential surface of the core; and
   an outer cladding that comprises quartz glass and that covers an outer circumferential surface of the inner cladding, wherein
   a refractive index of the inner cladding is substantially equal to a refractive index of the outer cladding, and
   the inner cladding contains the cladding updopant at a concentration such that a refractive index increase rate ascribed to the cladding updopant falls within a range of 0.25% to 0.5%.

2. The optical fiber according to claim 1, wherein the core contains the core updopant at a concentration such that a mode field diameter at a wavelength of 1550 nm falls within a range of 3.5 μm to 6.5 μm.

3. The optical fiber according to claim 1, wherein the inner cladding contains the downdopant at a concentration such that an absolute value of a relative refractive index difference of the inner cladding with respect to the outer cladding is 0.1% or less.

4. The optical fiber according to claim 1, wherein
   the core is doped with germanium as the core updopant, and
   the inner cladding is doped with fluorine as the downdopant.

5. The optical fiber according to claim 4, wherein the inner cladding is doped with one or both of phosphorus and germanium as the cladding updopant.

6. The optical fiber according to claim 4, wherein the inner cladding is further doped with boron as the downdopant.

7. The optical fiber according to claim 1, further comprising a pair of stress applying sections disposed symmetrically with respect to the core.

8. The optical fiber according to claim 7, wherein the pair of stress applying sections are disposed such that respective outer edges of the stress applying sections are in contact with or apart from an outer edge of the inner cladding.

9. An optical device comprising:
   the optical fiber according to claim 1;
   a semiconductor optical waveguide butt-joined to one end of the optical fiber; and
   a conventional single mode fiber (CSMF) that is fusion-spliced to an other end of the optical fiber.

10. The optical fiber as set forth in claim 1, wherein the optical fiber is fusion-spliced to a conventional single mode fiber (CSMF).

11. The optical fiber according to claim 1, wherein, in at least one end of the optical fiber during heat treatment or after the heat treatment, the outer cladding includes a first region with a relative refractive index difference lower than that of the inner cladding and an outer side of the first region includes a second region with a relative refractive index difference that is higher than that of the first region.

12. The optical fiber according to claim 1, wherein, in at least one end of the optical fiber during heat treatment or after the heat treatment, the core includes at least one region in which a concentration of the downdopant is greater than zero.

13. The optical fiber according to claim 11, wherein, in the at least one end of the optical fiber after the heat treatment, the concentration of the downdopant inside an entirety of the core is greater than zero.

14. An optical device comprising:
   the optical fiber according to claim 1; and
   a conventional single mode fiber (CSMF) fusion-spliced to one end of the optical fiber.

15. The optical device according to claim 14, further comprising:
   a semiconductor optical waveguide that is butt-joined to an other end of the optical fiber.

16. The optical fiber according to claim 10, wherein the CSMF is a G.652 or G.657 classified optical fiber defined by ITU Telecommunication Standardization Sector (ITU-T) standards.

* * * * *